United States Patent
Hazen et al.

(10) Patent No.: US 10,088,801 B2
(45) Date of Patent: Oct. 2, 2018

(54) FREEFORM HOLOGRAPHIC IMAGING APPARATUS AND METHOD

(75) Inventors: John Hazen, South Hadley, MA (US); Larry Hoague, Feedings Hills, MA (US)

(73) Assignee: HAZEN PAPER COMPANY, Holyoke, MA (US)

( * ) Notice: Subject to any disclaimer, the term of this patent is extended or adjusted under 35 U.S.C. 154(b) by 0 days.

(21) Appl. No.: 13/554,224

(22) Filed: Jul. 20, 2012

(65) Prior Publication Data

US 2014/0022617 A1    Jan. 23, 2014

(51) Int. Cl.
| | |
|---|---|
| *G03H 1/26* | (2006.01) |
| *G03H 1/30* | (2006.01) |
| *G03H 1/04* | (2006.01) |
| *G03H 1/00* | (2006.01) |
| *G03H 1/02* | (2006.01) |

(52) U.S. Cl.
CPC ......... G03H 1/0476 (2013.01); *G03H 1/0011* (2013.01); *G03H 1/0244* (2013.01); *G03H 2001/0439* (2013.01); *G03H 2001/0478* (2013.01); *G03H 2260/14* (2013.01); *G03H 2270/52* (2013.01)

(58) Field of Classification Search
CPC .. G03H 1/2294; G03H 1/0005; G03H 1/0443; G03H 1/0402; G03H 1/0866; G03H 2222/36; G03H 1/0476; G03H 1/0891; G03H 2001/2292; G03H 2001/2685; G02B 27/2292

USPC ......... 359/9, 10, 22–25, 32, 33, 35
See application file for complete search history.

(56) References Cited

U.S. PATENT DOCUMENTS

| | | | | |
|---|---|---|---|---|
| 6,817,530 | B2* | 11/2004 | Labrec et al. | 235/487 |
| 7,190,496 | B2* | 3/2007 | Klug et al. | 359/23 |
| 8,006,908 | B2* | 8/2011 | Bergmann | B42D 25/29 235/487 |

OTHER PUBLICATIONS

"Pixel," The Free Merriam-Webster Dictionary, Jan. 8, 2015, http://www.merriam-webster.com/dictionary/pixel.*

* cited by examiner

*Primary Examiner* — Jade R Chwasz
(74) *Attorney, Agent, or Firm* — Grogan, Tuccillo & Vanderleeden LLP

(57) ABSTRACT

A freeform holographic imaging apparatus includes an imaging table for supporting a substrate, an imaging beam positioned adjacent to the imaging table; and a controller operatively connected to the imaging beam and configured to control a position of the imaging beam with respect to the imaging table. The controller is configured to control the imaging beam to image first and second holographic optical elements on the substrate, wherein each of the first and second holographic optical elements are a single pixel. The first holographic optical element is imaged according to a first parameter set and the second holographic optical element is imaged according to a second parameter set.

15 Claims, 3 Drawing Sheets

FREEFORM HOLOGRAPHIC IMAGING APPARATUS AND METHOD

FIELD OF THE INVENTION

The present invention relates generally to a holographic imaging and, more particularly, to a holographic imaging apparatus and method for creating freeform holographic images.

BACKGROUND OF THE INVENTION

Holograms have long been used for security to indicate that a document or product is authentic and to increase the attractiveness of goods such as lottery and entertainment/sporting event tickets, product packaging such as for DVDs, event programs, calendars and magazines. Indeed, methods and apparatuses for creating holographic optical elements on a recording medium, i.e., substrate, to create an overall optical illusion have been known in the art for some time. As is well known, many such existing apparatuses may include an imaging table, such as a platen, on which the substrate is placed, an imaging laser and associated optics. One of the most well known types of holographic imaging apparatus is a split beam holographic imaging apparatus, which splits a laser into two beams, an object beam and reference beam. The object beam is spread, reflected off of an object and directed onto the recording medium. The reference beam travels directly onto the recording medium. When the two laser beams reach the recording medium, their light waves intersect to create an interference pattern on the substrate, thereby producing a holographic image having certain optical effects.

Notably, however, with known systems, the desired holographic image or optical elements are typically imaged as a whole, in an analog fashion, by using a master that creates the holographic design or optical element on the substrate. For example, as shown in FIG. 1, certain prior art imaging apparatuses for creating holographic or other optical effects, such as those disclosed in U.S. Pat. No. 7,298,533, utilize a master to imprint an optical element, such as a Fresnel lens optical element, in the surface of a substrate. As shown in FIG. 1, to produce the optical elements disclosed in, for example, the '533 patent, a circular, generally convex, stepped master is used to imprint a generally concave, circular optical element 10 in the surface of a thick substrate 12. The optical element 10 has a plurality of rings or steps 14 (actually Fresnel lenses) corresponding to the rings/steps of the master, wherein the rings/steps 14 closer to the center of the lens 10 are the deepest from the surface of the substrate 12.

As best shown in FIG. 2, the rings 14 have inclined refractive surfaces 16 that reflect light so as to form images and to create certain optical effects that may be perceived by a viewer. As the master is circular in shape, however, only circular-shaped optical elements may be produced. In order to produce optical elements having other shapes, the circular optical element 10 must be physically cut or shaved down. For example, to produce a triangle-shaped optical element 18, as shown in FIG. 1, the circular optical element 10 must itself be cut into a triangle shape, as indicated by the dashed lines 20. Moreover, if a sheet having optical elements of a variety of shapes or other holographic designs is desired, mechanical recombination, in which one optical element is physically cut and combined with another optical element to produce an integrated holographic pattern or optical image, must be utilized, which suffers from obvious manufacturing and cost drawbacks. Indeed, even when the optical elements within a pattern are all the same, a step and repeat process must be utilized in order to create an overall holographic pattern.

As will be readily appreciated, such step and repeat process, in addition to being more labor intensive and less customizable, leaves a visible line of demarcation between one image and the next. While there are some techniques that may be carried out to lessen the visibility of such lines, all such step and repeat processes invariably leave some form of demarcation or recombine lines in the final pattern.

Accordingly, while known holographic imaging apparatuses utilizing physical imprinting or surface relief are effective to a certain degree, such apparatuses are limited in the shape and intricacy of holographic images and optical elements that can be produced.

It has been discovered, however, that by imaging in a digital fashion, i.e., pixel by pixel, certain advantages such as the ability to create holographic images and optical elements of any shape and size may be realized.

SUMMARY OF THE INVENTION

It is an object of the present invention to provide a holographic imaging apparatus.

It is another object of the present invention to provide a freeform holographic imaging apparatus that is capable of creating holographic images/optical elements on a thin substrate.

It is another object of the present invention to provide a freeform holographic imaging apparatus capable of creating holographic images and optical elements having complex shapes and designs.

It is another object of the present invention to provide a freeform holographic imaging apparatus that is capable of creating holographic images and optical elements of various shapes and sizes.

It is another object of the present invention to provide a freeform holographic imaging apparatus that obviates the need to utilize mechanical recombination to produce an integrated holographic image comprising various optical elements.

It is another object of the present invention to provide a freeform holographic imaging apparatus that is capable of creating holographic images and optical elements on a pixel-by-pixel basis.

It is another object of the present invention to provide a freeform holographic imaging apparatus capable of creating holographic images having various optical effects utilizing the diffraction of light.

It is another object of the present invention to provide a freeform holographic imaging apparatus that is capable of creating optical elements that mimic common optical effects, such as the optical effect of a lens.

An embodiment of the inventive freeform holographic imaging apparatus includes an imaging table for supporting a substrate, an imaging beam positioned adjacent to the imaging table; and a controller operatively connected to the imaging beam and configured to control a position of the imaging beam with respect to the imaging table. The controller is configured to control the imaging beam to image first and second holographic optical elements on the substrate, wherein each of the first and second holographic optical elements are a single pixel. The first holographic optical element is imaged according to a first parameter set and the second holographic optical element is imaged according to a second parameter set.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 3:
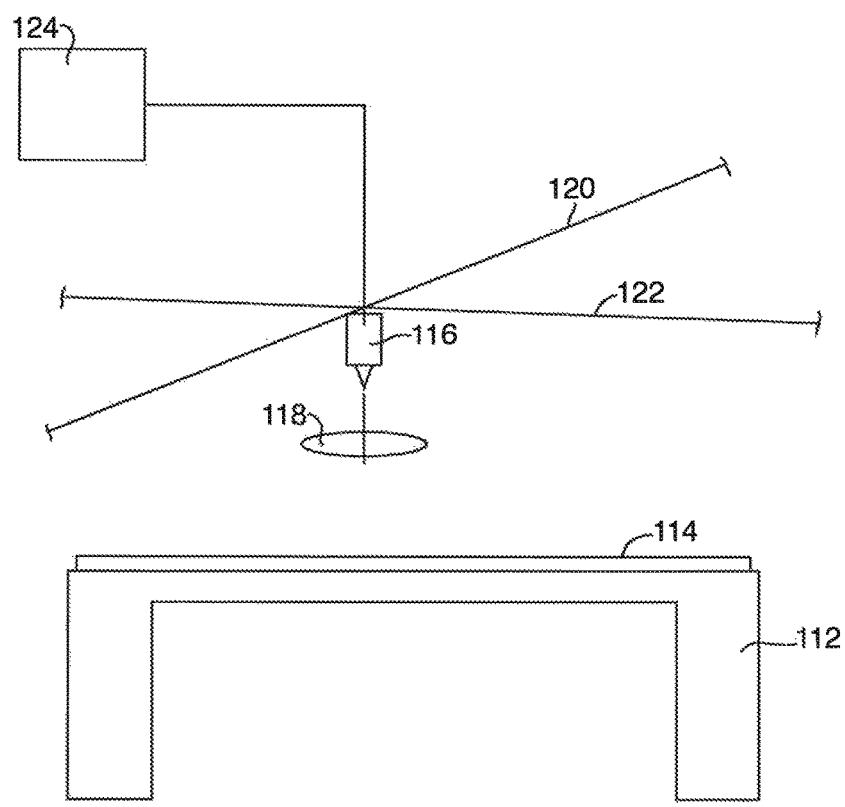
FIG. 3 illustrates a freeform holographic imaging apparatus according to an embodiment of the present invention.

Referring to FIG. 3, a freeform holographic imaging apparatus 100 for producing freeform holographic images/optical elements on a substrate is shown. As shown therein, the freeform holographic imaging apparatus includes an imaging table or platen 112 that supports a substrate 114 on which one or more holographic images/optical elements will be imaged. In an embodiment, the substrate 114 may be a paper or polymeric sheet having photoresist film or coating, however other types of substrates, such as a glass plate having a photoresist coating, may be utilized without departing from the broader aspects of the present invention.

An imaging laser head 116 capable of emitting an imaging laser beam, and associated optics 118 for splitting the laser beam into an object and reference beam, respectively, and for directing the object and reference beam to the surface of the substrate 114, are positioned generally above, and spaced from, the imaging table 112. The laser head and is mounted on a track for movement along a pair of axes 120, 122 such that the laser head 116 is capable of being positioned over any point above the imaging table 112. The laser head is electrically connected to a power source (not shown) and a controller 124. As discussed in detail hereinafter, the controller 124 is configured to control the movement of the laser head 116 along the axes 120, 122. In addition, the controller is configured to control the angle and rotation of the laser beam, as well as the spacing of the point of interference of the beams from the substrate 114, according to an imaging parameter set for a given holographic image/optical element. The optics 118 may be of any type known in the art, and common to existing split beam imaging apparatuses, such as a plurality of lens or a multi-faceted crystal, although other optics may also be utilized without departing from the broader aspects of the present invention.

Each holographic image or optical element to be imaged is comprised of an array of holographic optical elements, i.e., pixels, each having a parameter set. The parameter set may include the angle of incidence and rotation of the object beam and reference beam with respect to the substrate necessary to produce the desired optical element of the particular holographic image being printed, as well as the spacing of the point of interference of the object and reference beams from the substrate 114. At the very basic level, each optical element may consist of a single pixel having a specific parameter set.

In an embodiment, the controller 118 has input/output capabilities such that a particular holographic image(s) or optical element(s) to be imaged can be created using known pixelizing software, such as bitmap imaging software, and input into the controller 118. The controller 118 is also configured to determine the parameter set for each optical element to be imaged once the overall holographic pattern is input into the controller 118, and to control movement of the laser head 116 (and orientation of the laser beam) and associated optics 118 to image the various holographic optical elements on the substrate 118 according to the parameter sets.

In particular, the laser head 116, controlled by the controller 118 according to the determined parameter sets of the various optical elements, emits a laser beam to create diffraction gratings or "scratches" on the substrate 114. As will be readily appreciated, it is this array of individual diffraction gratings in the surface of the substrate 114 that make up each optical element and create the overall desired optical effect of the holographic image. Importantly, the diffraction gratings are created in a digital manner, i.e., on a pixel-by-pixel basis across the substrate 114 until the entire optical element is imaged. Because the diffraction gratings are imaged on a pixel-by-pixel basis, optical elements of almost any desired orientation, size and shape, such as oblong, parallelogram and wave shape, may be imaged on a single substrate, in a single session on the imaging apparatus, without the need for mechanical recombination or like processes. Indeed, because of the pixel-by-pixel imaging, even optical elements that are entirely free-form may be imaged utilizing the holographic imaging apparatus 100 of the present invention.

Figure 4:
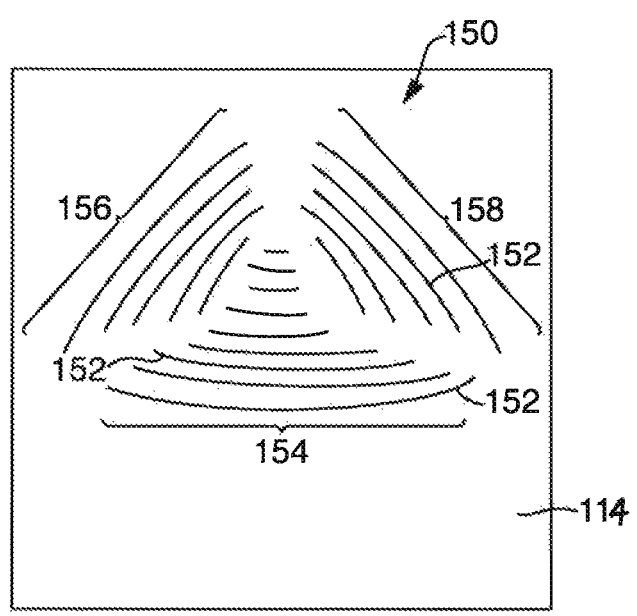
FIG. 4 illustrates a holographic image produced utilizing the freeform holographic imaging apparatus of FIG. 3.

With reference to FIG. 4, by way of example, a holographic optical element 150 produced utilizing the freeform holographic imaging apparatus 100 of the present invention is illustrated. As shown therein, the optical element 150 is triangular in shape and consists of a plurality of diffraction gratings 152 oriented in different directions. Indeed, because the imaging apparatus 100 is capable of creating diffraction gratings on a pixel-by-pixel basis, the diffraction gratings are created individually and can be any length and orientation. As shown therein, a first set of diffraction gratings 154 extends generally horizontally across the substrate, while a second set 156 and third set 158 are oriented at an angle to the first set 154 and converge at an apex of the optical element 150. As will be readily appreciated, the diffraction gratings 152 of each set are of varying lengths and orientations.

Figure 1:
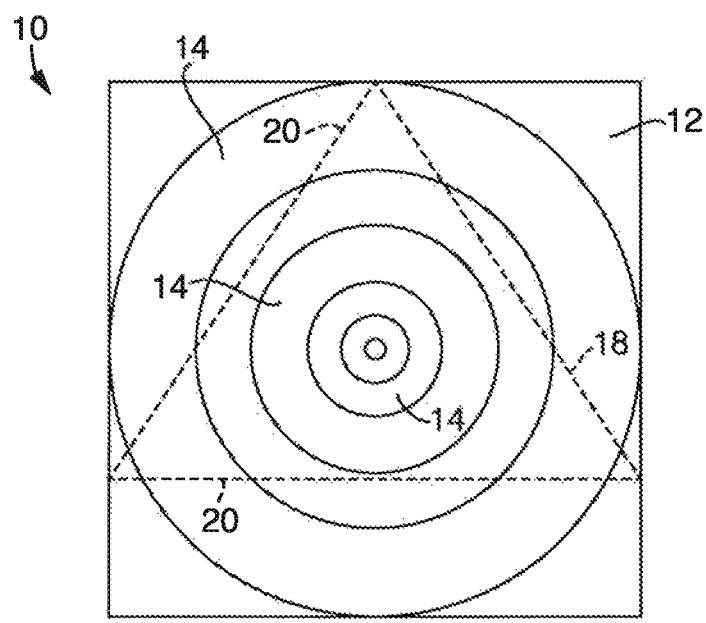
FIG. 1 illustrates a lens produced utilizing a known holographic imaging apparatus.
Figure 2:
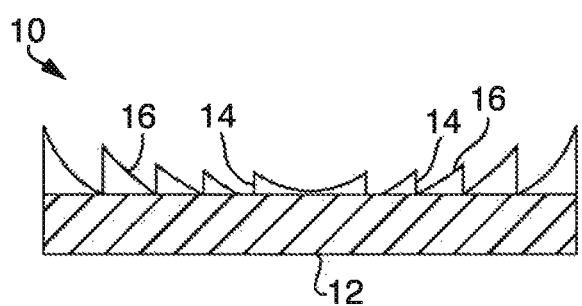
FIG. 2 is a cross-sectional view of the lens of FIG. 1.

Whereas the circular prior art lens of FIGS. 1 and 2 must to be physically cut or shaved down to produce a triangular lens, the apparatus 100 of the present invention is capable of creating an optical element that is triangular in shape simply by controlling the length and orientation of the diffraction gratings (i.e., without physically altering or cutting the optical element to shape). Whereas the prior art is limited to the shapes that can be cut from the circular lens 10 of FIG. 1, the apparatus 100 of the present invention is capable of producing optical elements that are completely freeform. As such, the apparatus 100 of the present invention has almost unlimited flexibility in creating any shape or image desired, including extremely intricate and complex shapes and designs. In addition, whereas prior art imaging apparatuses and methods require a different size master to be created if a different size optical element is desired, the apparatus 100 of the present invention can scale the size and shape of the optical element simply by controlling the size (i.e., extent) of the diffraction gratings utilized to construct the desired optical element. In this manner, size and shape of the optical elements to be imaged can be controlled in real-time. In contrast to known systems, the flexibility of the freeform holographic imaging apparatus 100 of the present is thus not predetermined by a single master.

Moreover, by imaging on a pixel-by-pixel bases, the apparatus of the present invention is capable of creating holographic optical elements, consisting of an array diffraction gratings, that mimic the perceived optical effects of known optical elements such as the Fresnel lenses of FIGS. 1 and 2 that are physically imprinted into the substrate (or created utilizing surface relief). Importantly, the holographic optical elements /images produced utilizing the apparatus of the present invention rely on the diffraction of light to produce a desired optical effect, such as mimicking a lens, while the prior art Fresnel lenses of FIGS. 1 and 2 utilize reflection. It is important to note, however, that because each pixel is not itself its own lens, any lens effect only occurs when certain diffraction gratings of certain pixels are oriented in a particular manner with respect to adjacent pixels (and their diffraction gratings). As such, the diffraction gratings of the pixels themselves are not true lenses, but only "mimic" lenses when oriented in a particular manner.

In particular, the imaging apparatus of the present invention, by the manner in which the diffraction gratings are produced on a pixel-by-pixel basis, is able to approximate complex optical elements that have heretofore only been capable of being produced in whole (e.g., through the imprinting of a Fresnel lens in a substrate as disclosed in the '533 patent). Moreover, the imaging apparatus of the present invention is thus capable of producing an integrated holographic pattern consisting of multiple similar or different optical elements utilizing a single step, single session process, i.e., without using a "step and repeat" process.

In an embodiment, the diffraction gratings 152 produced by the apparatus 100 of the present invention have a depth of approximately 1 micron, such that the surface of the substrate containing the optical elements/images appears and feels smooth. In addition, the depth of the diffraction gratings 152 is substantially the same across the entire sheet. Because of the very shallow depth of the diffraction gratings, and thus the optical elements themselves, the substrate on which the holographic images/optical elements are imaged may be substantially thin. As such, sheets containing holographic images produced in this manner have a variety of applications. This is in contrast to the prior art lens 10 of FIG. 1, which is actually imprinted into the substrate, and has a depth on the order of 7-10 microns or greater. As 7-10 microns, or more, are needed to create the prior art lens 10, sheets containing such optical elements are limited in how thin they can be, thus limiting their use. Moreover, because of the substantial thickness of the substrate and depth of the prior art lens 10, and the non-uniform depth within a single optical element, this lens can actually be felt and seen by a user when handling the sheet, which is undesirable.

Another advantage of the freeform holographic imaging apparatus of the present invention is the ability to imbed 3-dimensional text within a given optical element, such as a lens, during imaging. In addition, the apparatus of the present invention is capable of creating diffraction gratings that have the effect of changing the color of the image in dependence upon the angle from which it is viewed. In particular, by imaging on a pixel-by-pixel basis, distinct and particular colors, depending on the angle at which the images is viewed, can be created with certainty and almost unlimited flexibility. Indeed, one of the other artistic advantages resulting from the flexibility of the imaging apparatus of the present invention is that the resultant images contain more apparent "motion" that is viewable by an observer, which is not possible with more deeply imbedded images produced utilizing existing processes. As will be readily appreciated, all of this may be done without stopping operation of the apparatus to manually adjust components, reconfigure the apparatus, or the like.

By constructing a holographic image (i.e, optical element) on a pixel-by-pixel basis utilizing diffraction gratings in the surface of a substrate, numerous benefits may be realized. For example, as alluded to above, the substrate used may be relatively thin, on the order of 1-2 microns, in contrast to surface relief holographic/optical elements which require much thicker, more resilient and expensive substrates. In addition, holographic images of any shape and size (i.e., freeform) may be created, including holographic images that mimic almost any optical effect desired, such as that of a lens. Moreover, multiple repeated or separate images may be imaged on a single substrate in a single session on the apparatus by loading the layout of the images into the controller prior to imaging.

Moreover, by constructing holographic images on a pixel-by-pixel basis utilizing diffraction gratings in the surface of a substrate, there are no demarcation or recombine lines on the substrate between each individual image. Accordingly, the resultant integrated holographic pattern appears seamless and offers a more appealing visual experience for a viewer, in contrast to existing "step and repeat" methods which leave visible lines between each image.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A freeform holographic recording apparatus, comprising:
    a recording table for supporting a tangible substrate;
    a single recording laser positioned adjacent to said recording table; and
    a controller operatively connected to control said single recording laser and configured to control a position of said recording laser with respect to said recording table;
    wherein said controller is configured to receive an input including a holographic pattern to be recorded, said holographic pattern having at least first and second holographic optical elemqents;
    wherein said input further includes non-holographic patterns having an associated non-holographic parameter set;
    wherein said controller determines a first parameter set corresponding to said first holographic optical element and a second parameter set corresponding to said second holographic element;
    wherein said controller is configured to determine a recording sequence for said holographic pattern and said non-holographic patterns in dependence upon the determined parameter sets for each holographic optical element of said pattern, and said non-holographic parameter set;
    wherein said controller is configured to control said single recording laser to permanently record said holographic pattern including said first and said second holographic optical elements on said tangible substrate, said imaging laser also permanently recording said non-holographic patterns on said tangible substrate, such that said holographic patterns and said non-holographic patterns are recorded during a common imaging process; and wherein said controller is configured to control said single recording laser to create diffraction gratings on a surface of said tangible substrate to record said first and second holographic optical elements, and said non-holographic patterns, during said common recording process without manually manipulating said recording table, said substrate or said single recording laser;

wherein said common recording process causes the deformation of the surface of said tangible substrate.

2. The freeform holographic recording apparatus of claim 1, wherein:
said first parameter set is different from said second parameter set.

3. The freeform holographic recording apparatus of claim 1, wherein:
said first parameter set is the same as said second parameter set.

4. The freeform holographic recording apparatus of claim 1, wherein:
said first parameter set includes an angle and rotation of a recording beam of said single recording laser necessary to image said first optical element.

5. The freeform holographic recording apparatus of claim 1, wherein:
said first and said second parameter sets contain information relating to an angle and rotation of said recording beam necessary to record said first and said second optical elements.

6. The freeform holographic recording apparatus of claim 1, wherein:
said substrate is approximately 1-2 microns thick and said diffraction gratings have a depth of less than approximately 1 micron.

7. A method of recording an integrated holographic pattern having a plurality of optical elements, said method comprising the steps of:
arranging a single recording beam adjacent to a tangible substrate;
preloading a holographic pattern into a controller, said holographic pattern including a plurality of holographic optical elements including at least a first optical element and a second optical element, said first optical element having a first holographic parameter set and said second optical element having a second holographic parameter set;
preloading a non-holographic pattern into said controller, said non-holographic pattern having a non-holographic parameter set;
determining a recording sequence for said holographic pattern and said non-holographic pattern in dependence upon said first and said second parameter sets for each optical element of said pattern, and said non-holographic parameter set, said first and second parameter sets and said non-holographic parameter set forming an integrated recording parameter set; and
controlling said single recording beam to create diffraction gratings on a surface of said tangible substrate to permanently record said integrated recording parameter set in a single imaging session without manually manipulating elements of a recording apparatus between recording of said first optical element and said second optical element,
wherein said single imaging session causes the deformation of the surface of said tangible substrate.

8. The method according to claim 7, wherein:
said first and said second holographic parameter data sets are the same.

9. The method according to claim 7, wherein:
said first and said second holographic parameter data sets are different.

10. The method according to claim 7, wherein:
said first holographic parameter data set includes an angle and rotation of said single recording beam necessary to record said first optical element.

11. The method according to claim 7, wherein:
said first optical element has a different size than said second optical element.

12. The method according to claim 7, wherein:
said first optical element has a different shape than said second optical element.

13. The method according to claim 7, wherein:
said first optical element has a different optical characteristic than said second optical element.

14. The method according to claim 13, wherein:
said optical characteristic is a focal length.

15. The method according to claim 13, wherein:
said optical characteristic is a perceived color.

* * * * *